(No Model.)
W. A. McDANIEL.
FARM GATE.
No. 548,720. Patented Oct. 29, 1895.
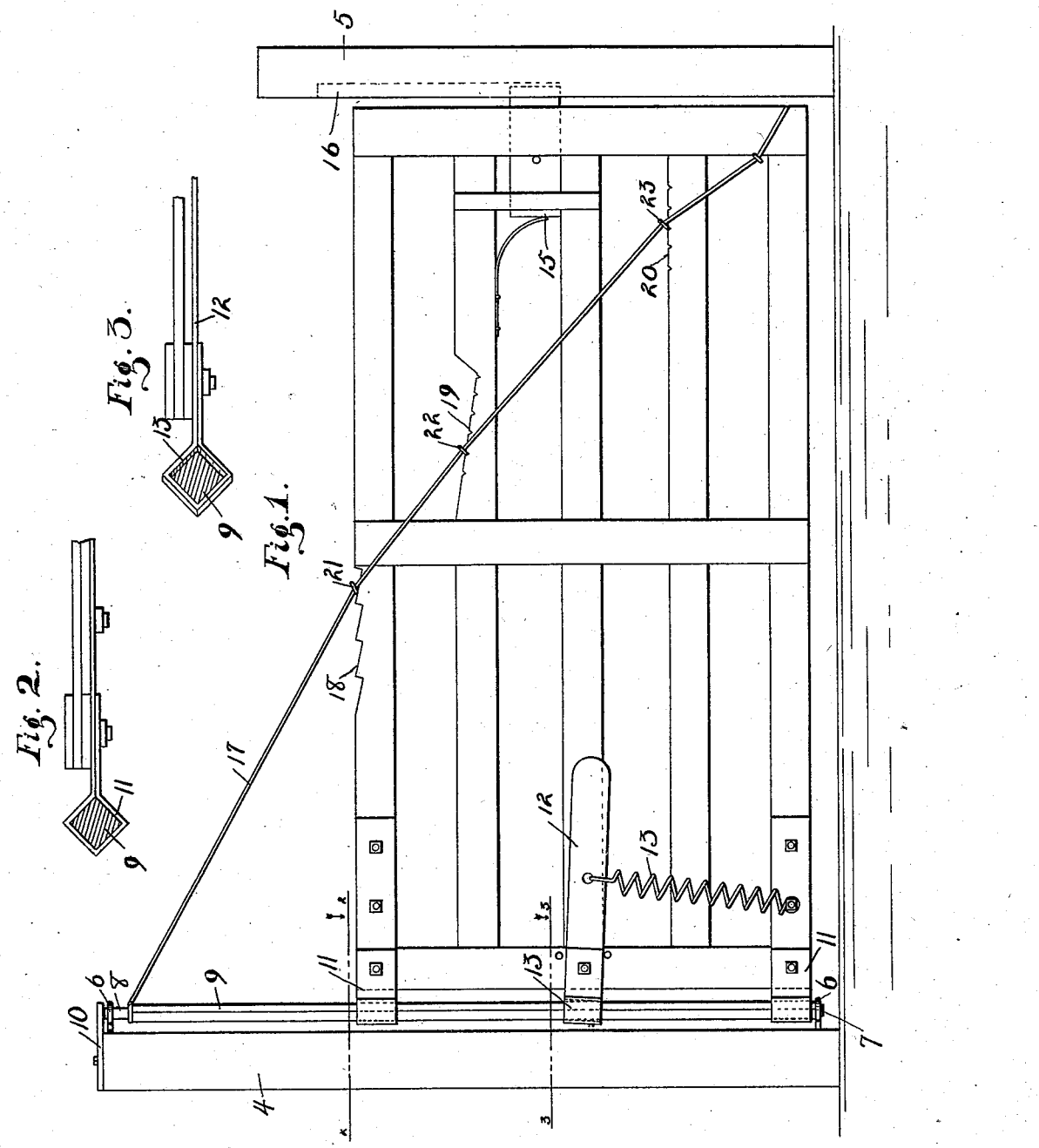
Witnesses
M. V. Hood.
David McCulloch.
Inventor
William A. McDaniel.
By Attorneys
H. P. Hood & Son.

UNITED STATES PATENT OFFICE.

WILLIAM A. McDANIEL, OF THORNTOWN, INDIANA.

FARM-GATE.

SPECIFICATION forming part of Letters Patent No. 548,720, dated October 29, 1895.

Application filed August 17, 1895. Serial No. 559,586. (No model.)

*To all whom it may concern:*

Be it known that I, WILLIAM A. McDANIEL, a citizen of the United States, residing at Thorntown, in the county of Boone and State of Indiana, have invented a new and useful Farm-Gate, of which the following is a specification.

My invention relates to an improvement in that class of farm-gates which can be vertically adjusted.

The object of my invention is to hold the gate at any desired point of vertical adjustment, to prevent any sag of the gate when said gate is in any position, and to facilitate the dismounting of the gate when desired.

The accompanying drawings illustrate my invention.

Figure 1 is a side elevation showing the gate in its lowest position. Fig. 2 is an enlarged section on line 2 2, Fig. 1; and Fig. 3 is a similar section on line 3 3.

In the drawings 4 indicates the post upon which the gate is hung, and 5 indicates the opposite post. Near each end of post 4 is secured an eyebolt 6, said eyebolts forming bearings for journals 7 and 8, formed on the ends of hinge-bar 9, said bar being rectangular in cross-section. In order to allow the removal of bar 9, the upper journal 8 is made somewhat longer than journal 7, so that the said bar may be easily lifted and slipped first from the lower and then from the upper eyebolt. In order to prevent the accidental displacement of hinge-bar 9, a turn-button 10 is pivoted to the top of post 4, said turn-button projecting over and coming in close proximity to the upper end of the bar.

The gate is attached to the hinge-bar by means of a pair of straps 11, attached to the upper and lower rails. Said straps are each provided with a rectangular eye which embraces the hinge-bar, the arrangement being such that diagonal corners of the hinge-bar, when engaged by the straps, lie in a plane parallel to the gate.

Pivoted at or near the center of the hinge side of the gate is a clutch 12. Said clutch is provided at one end with a rectangular eye 13, which loosely embraces the hinge-bar 9, and to its opposite end is attached a spring 14, which extends downward and is attached at its other end to some portion of the gate. Spring 14 draws the outer end of clutch 12 downward, and this movement twists eye 13 upon the hinge-bar, thus bringing the lower front corner and upper rear corner of said eye into contact with the corners of said hinge-bar, thereby preventing the downward or upward movement of the gate. The free end of the gate is provided with a latch 15, which engages with the sides of a longitudinal slot 16 in post 5.

Gates of the class described are very often of some length and have a considerable tendency to sag. In order to prevent any sag at any point of vertical adjustment of the gate, I secure to the upper end of hinge-bar 9 a pair of parallel guy-wires 17, which run from said point of attachment, one on each side of the gate, and are secured at their lower ends to the outer lower edge of the gate. Secured to or formed integral with several of the bars of the gate are series of teeth 18, 19, and 20, which are adapted to be engaged by catches 21, 22, and 23, which embrace both wires 18 and are adapted to slide thereon. By this construction the outer end of the gate may be raised or lowered by changing the position of catches 21, 22, and 23 on teeth 18, 19, and 20, and this same adjustment may be made in whatever position the gate as a whole may be placed. In order to raise the gate from the position shown in Fig. 1, clutch 12 is raised against the action of spring 14. The gate is then raised, clutch 12 released so as to engage bar 9, and catches 21, 22, and 23 are successively tightened.

By the construction shown and described it may be seen that I have produced a cheap and effectual gate of the class described, which may be readily adjusted, easily mounted and dismounted, and all sag thereof prevented.

I claim as my invention—

1. In a gate, the combination with the hinge bar having a pair of journals, of bearings for said journals secured to a fixed support, a pair of straps connected to the gate and embracing the hinge bar, and a clutch pivoted to the gate and provided with an eye which loosely surrounds the hinge bar, said eye being adapted to be twisted upon, and to engage with, the hinge bar and to thereby hold the gate in any desired vertical position, substantially as shown and described.

2. In a gate, the combination with a vertical hinge bar having a pair of journals, of bearings for said journals secured to a fixed support, a pair of straps connected to the gate and embracing the hinge bar, a clutch pivoted to the gate and provided with an eye which loosely surrounds the hinge bar, said eye being adapted to be twisted upon, and to engage with the hinge bar, and a spring secured at one end to the free end of the pivoted clutch and at the other end to the gate, whereby the pivoted clutch is positively held in engagement with the hinge bar and thereby prevents a downward or upward movement of the gate, substantially as described.

WILLIAM A. McDANIEL.

Witnesses:
B. J. SEFTON,
W. T. HARRIS.